US011528587B2

(12) United States Patent
Novlan et al.

(10) Patent No.: US 11,528,587 B2
(45) Date of Patent: *Dec. 13, 2022

(54) MULTI-CONNECTIVITY BASED VEHICLE-TO-EVERYTHING COMMUNICATIONS IN A WIRELESS NETWORK

(71) Applicant: AT&T Intellectual Property I, L.P., Atlanta, GA (US)

(72) Inventors: Thomas Novlan, Austin, TX (US); Xiaoyi Wang, Austin, TX (US); Arunabha Ghosh, Austin, TX (US); Milap Majmundar, Austin, TX (US); Andrew Thornburg, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/190,506

(22) Filed: Mar. 3, 2021

(65) Prior Publication Data

US 2021/0195389 A1 Jun. 24, 2021

Related U.S. Application Data

(63) Continuation of application No. 16/100,650, filed on Aug. 10, 2018, now Pat. No. 10,979,874.

(51) Int. Cl.
*H04W 4/00* (2018.01)
*H04W 76/15* (2018.01)
(Continued)

(52) U.S. Cl.
CPC .............. *H04W 4/40* (2018.02); *G08G 1/22* (2013.01); *H04W 4/08* (2013.01); *H04W 8/14* (2013.01);
(Continued)

(58) Field of Classification Search
CPC ....... H04W 4/40; H04W 76/15; H04W 76/14; H04W 4/08; H04W 8/14; H04W 12/06;
(Continued)

(56) References Cited

U.S. PATENT DOCUMENTS 9,990,844 B2 6/2018 Park et al.
2012/0094594 A1 4/2012 Rofougaran et al.
(Continued)

FOREIGN PATENT DOCUMENTS

CN 105657842 A1 6/2016
KR 10-1043959 B1 6/2011
(Continued)

OTHER PUBLICATIONS

Giordani, et al., "An Efficient Uplink Multi-Connectivity Scheme for 5G mmWave Control Plane Applications,"arXiv:1610.04836v2 [cs.NI] Jul. 21, 2017, 32 pages.
(Continued)

*Primary Examiner* — Faisal Choudhury
(74) *Attorney, Agent, or Firm* — Amin, Turocy & Watson, LLP

(57) ABSTRACT

The described technology is generally directed towards a multi-connectivity (three or more simultaneous communication links) framework in a wireless communication network, including aspects and components that support the operation of New Radio vehicle-to-everything (V2X) services. Aspects of the framework include initial access and V2X establishment, local manager selection, sidelink and cellular resource configuration, mobility and measurements (and reporting), group communication and vehicular platooning support, and V2X configuration and local manager association.

20 Claims, 13 Drawing Sheets

(51) Int. Cl.
| | |
|---|---|
| *H04W 4/40* | (2018.01) |
| *H04W 4/08* | (2009.01) |
| *G08G 1/00* | (2006.01) |
| *H04W 72/04* | (2009.01) |
| *H04W 8/14* | (2009.01) |
| *H04W 24/10* | (2009.01) |
| *H04W 12/06* | (2021.01) |
| *H04W 84/20* | (2009.01) |
| *H04W 76/14* | (2018.01) |

(52) U.S. Cl.
CPC ........... *H04W 12/06* (2013.01); *H04W 24/10* (2013.01); *H04W 72/0406* (2013.01); *H04W 76/14* (2018.02); *H04W 76/15* (2018.02); *H04W 84/20* (2013.01)

(58) Field of Classification Search
CPC . H04W 24/10; H04W 72/0406; H04W 84/20; G08G 1/22
USPC ......................................................... 370/329
See application file for complete search history.

(56) References Cited

U.S. PATENT DOCUMENTS

| | | | |
|---|---|---|---|
| 2012/0155316 A1 | 6/2012 | Li et al. | |
| 2015/0382268 A1* | 12/2015 | Hampel | H04W 36/24 455/436 |
| 2016/0020876 A1* | 1/2016 | Raghavan | H04B 7/0617 370/252 |
| 2016/0112992 A1* | 4/2016 | Bhushan | H04W 72/1257 370/330 |
| 2016/0192363 A1* | 6/2016 | Kasher | H04L 5/00 370/329 |
| 2017/0099624 A1 | 4/2017 | Baghel et al. | |
| 2018/0049235 A1 | 2/2018 | Baghel et al. | |
| 2018/0063825 A1 | 3/2018 | Van et al. | |
| 2018/0124650 A1 | 5/2018 | Park et al. | |
| 2018/0160436 A1 | 6/2018 | Park et al. | |
| 2018/0343604 A1* | 11/2018 | Wu | H04L 5/0098 |
| 2019/0053115 A1 | 2/2019 | Ngai et al. | |
| 2019/0069228 A1 | 2/2019 | Malik et al. | |
| 2019/0150042 A1* | 5/2019 | Srivastava | H04W 36/14 455/436 |
| 2019/0191424 A1 | 6/2019 | Wang et al. | |
| 2019/0200337 A1 | 6/2019 | Zhou et al. | |
| 2019/0207636 A1 | 7/2019 | Luo et al. | |
| 2019/0306911 A1 | 10/2019 | Hahn | |
| 2019/0320358 A1 | 10/2019 | Knapp | |
| 2019/0356451 A1 | 11/2019 | Zhang et al. | |
| 2020/0119869 A1 | 4/2020 | Faherzadeh et al. | |

FOREIGN PATENT DOCUMENTS

| | | |
|---|---|---|
| WO | 2017/045708 A1 | 3/2017 |
| WO | 2017/081360 A1 | 5/2017 |
| WO | 2017/136627 A1 | 8/2017 |
| WO | 2017/171526 A1 | 10/2017 |
| WO | 2017/171909 A1 | 10/2017 |
| WO | 2017/173051 A1 | 10/2017 |
| WO | 2017/189035 A1 | 11/2017 |
| WO | 2017/194212 A1 | 11/2017 |
| WO | 2018/006313 A1 | 1/2018 |
| WO | 2018/016157 A1 | 1/2018 |
| WO | 2018/029023 A1 | 2/2018 |
| WO | 2018/062948 A1 | 4/2018 |
| WO | 2018/064179 A1 | 4/2018 |
| WO | 2018/066876 A1 | 4/2018 |
| WO | 2018/075828 A1 | 4/2018 |
| WO | 2018/106467 A1 | 6/2018 |

OTHER PUBLICATIONS

Lianghai, et al., "Applying Multiradio Access Technologies for Reliability Enhancement in Vehicle- to-Everything Communication," vol. 6, 2018, 16 pages.

Non-Final Office Action received for U.S. Appl. No. 16/100,650 dated Jan. 21, 2020, 25 pages.

Final Office Action received for U.S. Appl. No. 16/100,650 dated May 4, 2020, 22 pages.

Non-Final Office Action received for U.S. Appl. No. 16/100,650 dated Aug. 19, 2020, 22 pages.

* cited by examiner

MULTI-CONNECTIVITY BASED VEHICLE-TO-EVERYTHING COMMUNICATIONS IN A WIRELESS NETWORK

RELATED APPLICATION

The subject patent application is a continuation of, and claims priority to, U.S. patent application Ser. No. 16/100,650, filed Aug. 10, 2018, and entitled "MULTI-CONNECTIVITY BASED VEHICLE-TO-EVERYTHING COMMUNICATIONS IN A WIRELESS NETWORK," the entirety of which application is hereby incorporated by reference herein.

TECHNICAL FIELD

The subject application is related to wireless communication systems, and, for example, to vehicle-to-everything (V2X) communications, using multi-connectivity, in a wireless network.

BACKGROUND

Dual connectivity in wireless communication systems generally refers to communicating control plane functions over LTE and managing the data plane over New Radio (NR, sometimes referred to as 5G). This provides for simplified early NR deployments, where device support for both LTE and NR is expected.

When the control plane is provided over LTE, more robust signaling is often possible, relative to NR operation on millimeter wave (mmWave) bands where radio link outage events tend to occur. Notwithstanding, future deployments may migrate to standalone NR operation as well, where control plane information is also sent over NR.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
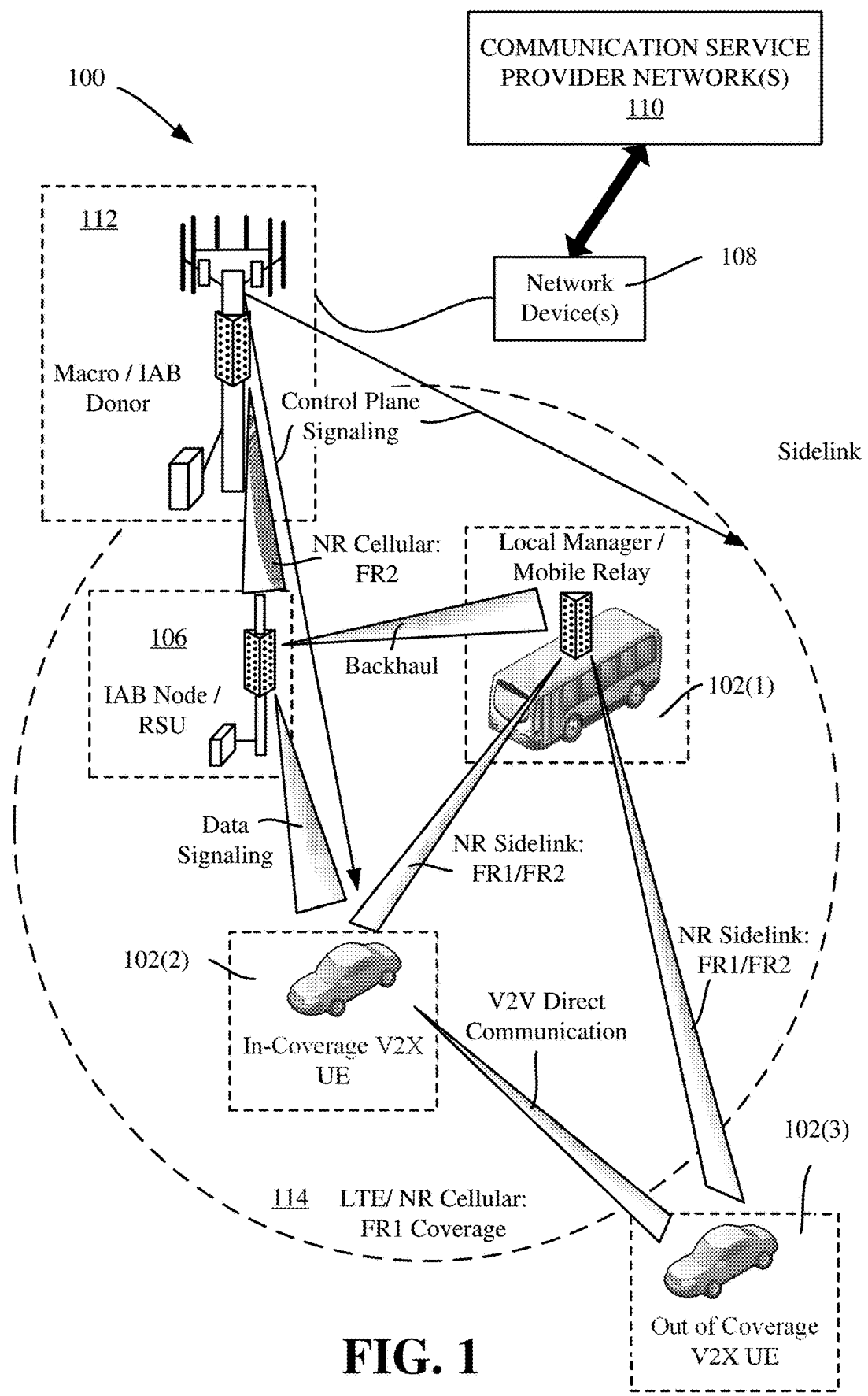
FIG. 1 illustrates an example wireless communication system showing an example of a vehicle-to-everything (V2X) deployment with multi-connectivity, in accordance with various aspects and implementations of the subject disclosure.

Briefly, one or more aspects of the technology described herein are generally directed towards a multi-connectivity framework that supports the operation of New Radio (NR, sometimes referred to as 5G) vehicle-to-everything (V2X) services. As will be understood, the technology allows seamless integration of V2X user equipment (UEs) with network assistance by supporting control and mobility functionality on cellular links (e.g. LTE or NR), which provides benefits of robustness, reduced overhead, and global resource management, while facilitating direct communication links via NR sidelink.

Aspects of the technology comprise performing initial access from a user equipment (UE) to the network, radio resource control (RRC) operations, radio resource management (RRM) operations, and radio link monitoring (RLM) operations for V2X. As will be understood, the use multi-connectivity (where "multi-connectivity" refers to three or more simultaneous or generally simultaneous communication links) supports the operation of vehicle-to-everything (V2X) services, where mobility and communication robustness requirements can be relatively stringent.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device" or simply "network device" is used herein. These terms may be used interchangeably, and refer to any type of network node that serves a UE and/or connected to other network node or network element or any radio node from where the UE receives a signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the UE operates using multiple carriers, e.g., LTE FDD/TDD, WCMDA/HSPA, GSM/GERAN, Wi Fi, WLAN, WiMax, CDMA2000, etc.

The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled).

As is known, instead of having a peer-to-peer mesh network, recent wireless radio technology provides the ability promote a UE (which can be a special type of UE such as a Vehicle or Road-side Unit) to act as local manager for a group of neighboring UEs. A local manager can act a relay node. The local manager can provide access to UEs, and can schedule UEs over a Sidelink interface with radio resources from a resource pool granted by the network, while maintaining a hierarchical network architecture which can be used in conjunction with infrastructure-based IAB deployments. Note that it is also known that a local manager can be elected by other neighboring UEs without network involvement. In one aspect, such a local manager can operate as a scheduling UE as described herein.

FIG. 1 illustrates an example wireless communication system 100, comprising a V2X multi-connectivity deployment in accordance with various aspects and embodiments of the subject technology. In one or more embodiments, the system 100 can comprise one or more UEs; three such UEs 102(1)-102(3) are exemplified in FIG. 1.

In the example of FIG. 1, different links are used to provide control and data communication with the V2X. One such link represents control plane signaling, comprising an LTE or NR cellular link on a first frequency range (FR1) carrier (e.g. sub-6 GHz). Another exemplified link(s) is a NR cellular link on a second frequency range (FR2) carrier (e.g. mmWave); yet another exemplified link is a NR direct user equipment communication (sidelink) link on either FR1 or FR2.

As represented in FIG. 1, certain V2X UEs such as the local manager/mobile relay 102(1) may be capable of acting as mobile relays/integrated access and backhaul (IAB) nodes, where such a relay node connects to an IAB node 106 via a cellular link in order to route cellular traffic to/from one or more UEs (which may be inside or outside cellular coverage) and the core network. Note that the core network is represented in FIG. 1 via blocks 108 (network device(s)) and 110 (communication service provider network(s)), and may be coupled via Macro/IAB Donor block 112 that establishes the LTE/NR Cellular: FR1 coverage via control plane signaling. The backhaul traffic can be carried on FR1 or FR2, using either cellular or sidelink interfaces to the UEs. Note that the IAB node 106 can be a roadside unit (RSU) capable of connecting with other UEs (e.g., 102(2)), such as for data communication.

In various embodiments, the system 100 is or comprises a wireless communication network serviced by one or more wireless communication network providers. In example embodiments, a UE (collectively or individually 102) can be communicatively coupled to the wireless communication network via a network device 104 (e.g., network node). The network device 108 can communicate (directly or indirectly) with the UE 102, thus providing connectivity between the UE and the wider cellular network.

In example implementations, each UE 102 such as the UE 102(1) is able to send and/or receive communication data via a wireless link to the network device 108. The system 100 can thus include one or more communication service provider networks 110 that facilitate providing wireless communication services to various UEs, including UEs 102(1)-102(3), via the network device 108 and/or various additional network devices (as is understood) included in the one or more communication service provider networks 110. The one or more communication service provider networks 110 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 108 can be connected to the one or more communication service provider networks 110 via one or more backhaul links or the like. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 102 and the network device 108). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 108) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

As represented in FIG. 1, multiple types of communication traffic can be provided on the different links. For example, the control plane signaling (e.g. SRB or Signaling Radio Bearer) is provided on FR1, while data signaling for cellular-based traffic is provided on a FR2 carrier (e.g. DRB or Data Radio Bearer). The data traffic may be sent by a different node relative to that of the control plane signaling, because macro nodes may be used for providing basic coverage and mobility support, while a dense deployment of small cells/road-side access point units, e.g., 106, can provide higher throughput access, but with smaller coverage regions.

A third communication link type is sidelink, which enables direct communication between UEs whether they are inside or outside network coverage. Sidelink communication can be established between two UEs (e.g., 102(2) and 102(3)) or can be facilitated by a selected type of V2X UE called a local manager (e.g., 102(1), shown communicating via sidelink with UE 102(3)). A local manager can manage the discovery and link management of one or more V2X UEs (e.g., members of a group) that are connected to/associated with the local manager. Additionally, the local manager can provide resource allocation/scheduling for direct communication between one or more V2X UEs and/or provide local breakout services by routing traffic for V2X UEs over sidelink, including without involvement of the cellular network.

Figure 2:
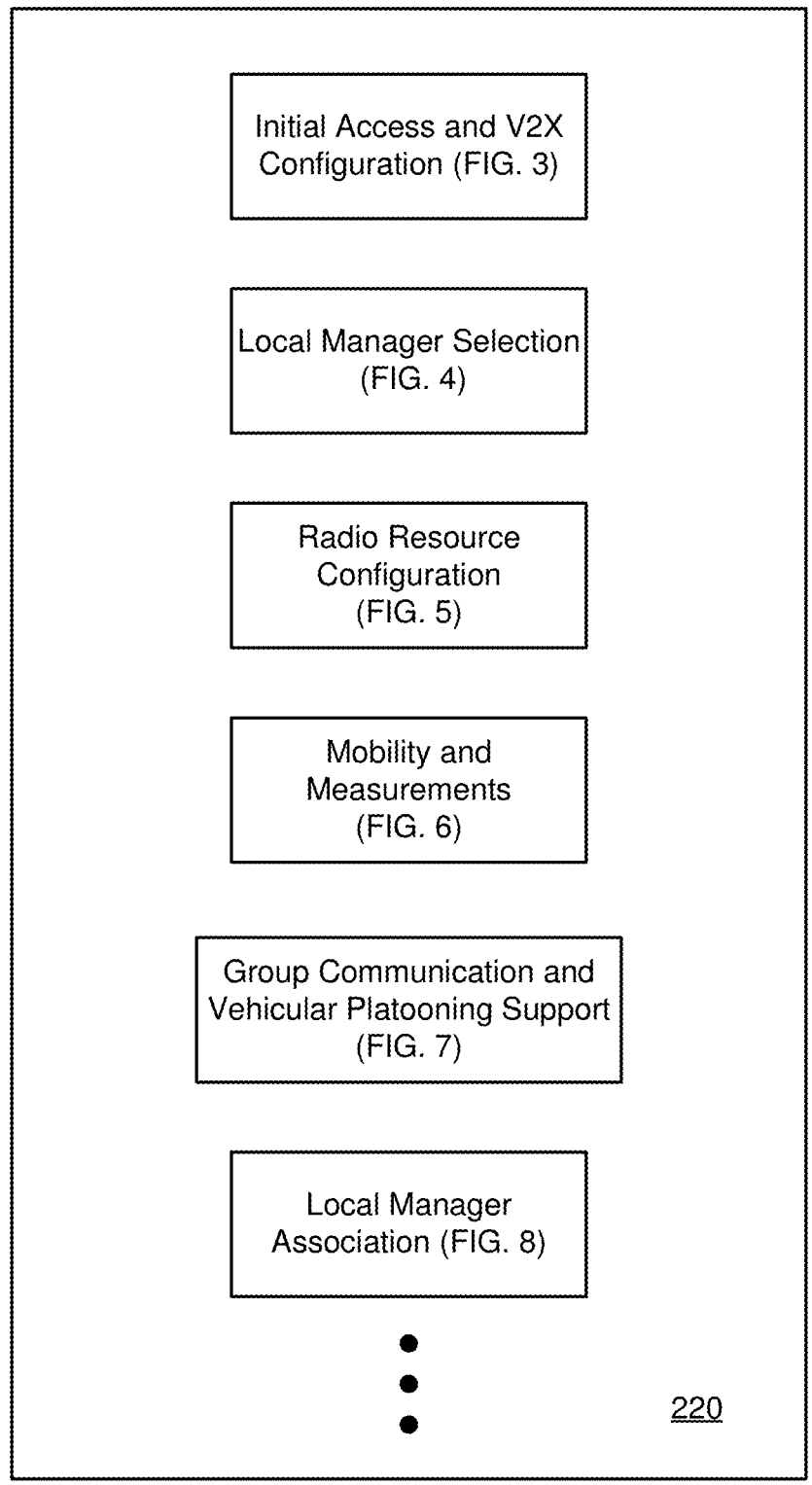
FIG. 2 illustrates various example aspects of a framework for multi-connectivity in V2X communications, in accordance with various aspects and implementations of the subject disclosure.
Figure 7:
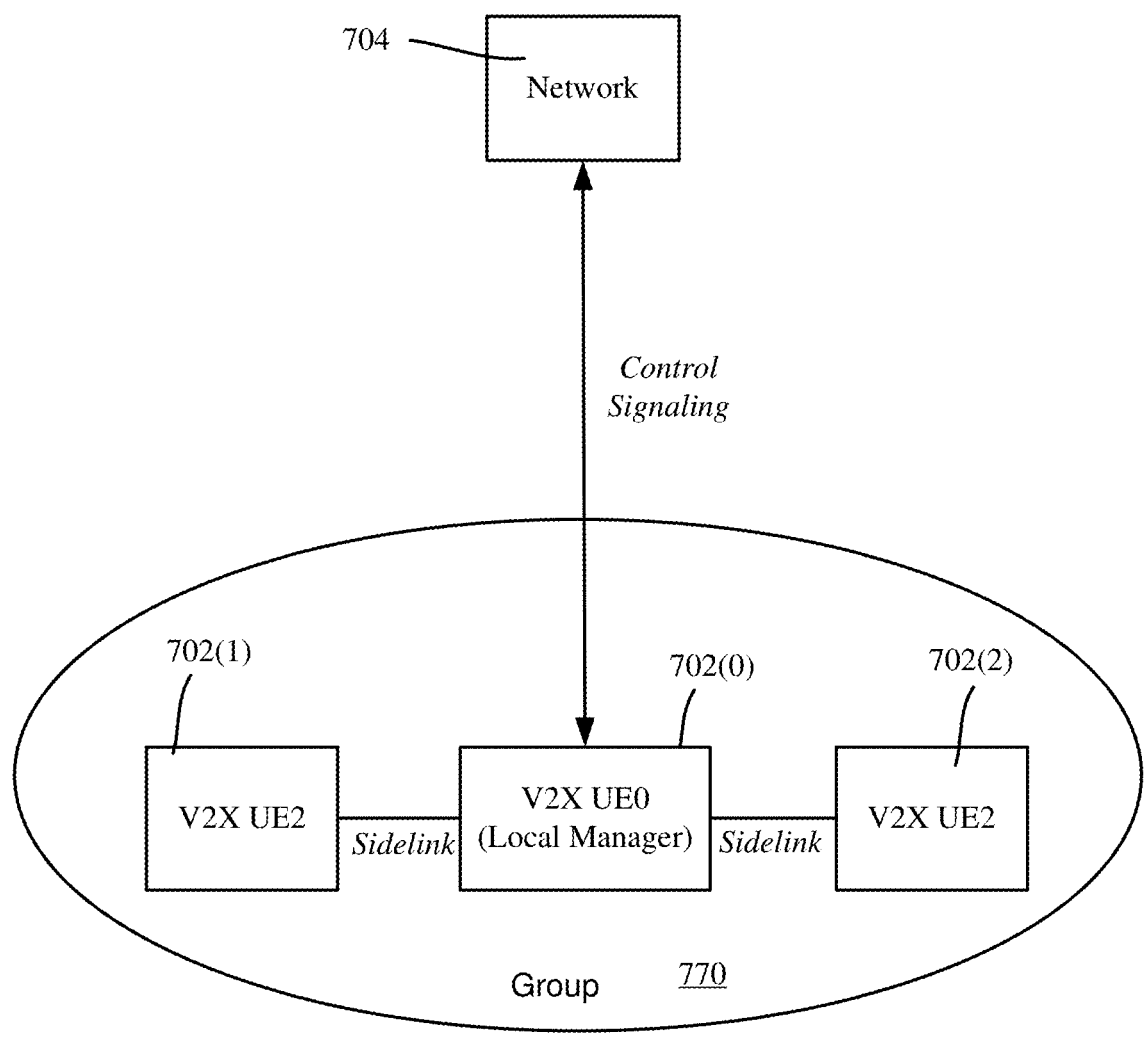
FIG. 7 illustrates various example aspects and components related to group communication and vehicular platooning support for V2X multi-connectivity communications, in accordance with various aspects and implementations of the subject disclosure
Figure 8:
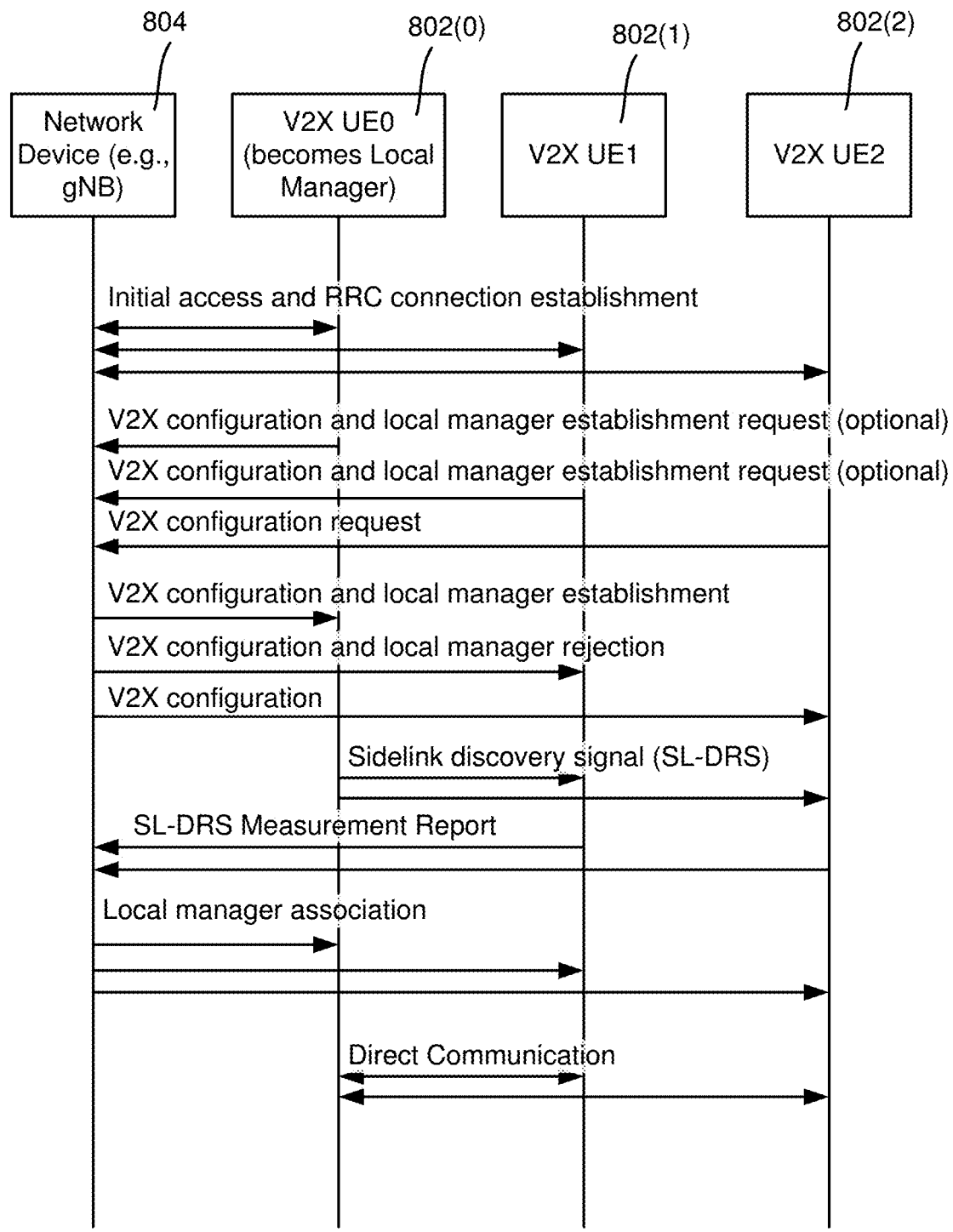
FIG. 8 illustrates various example aspects and components related to v2x configuration and local manager association in accordance with various aspects and implementations of the subject disclosure

Under an existing cellular network framework, a device can only maintain two simultaneous connections (i.e. dual-connectivity) between a master cell group (MCG) and a secondary cell group (SCG), which may or may not correspond to fixed co-located base station equipment. In contrast, the V2X multi-connectivity framework described herein enables different combinations of links to be supported, depending on the services provided and/or the current radio conditions and UE capabilities. It should be noted that other examples (in addition to the above-exemplified LTE or NR cellular link on a first frequency range (FR1) carrier (e.g. sub-6 GHz), NR cellular link on a second frequency range (FR2) carrier (e.g. mmWave), and NR sidelink on either FR1 or FR2) are possible, including the following:

FR1 LTE cellular: control, FR2 NR cellular: data
FR1 LTE cellular: control, FR2 sidelink: direct communication
FR2 NR cellular: control/data, FR2 sidelink: direct communication
FR1 LTE cellular: control, FR2 NR cellular: data, FR2 sidelink: direct communication Turning to various example aspects of a V2X multi-connectivity framework 220 (FIG. 2), described herein are examples of V2X operation using multi-connectivity, including initial access and V2X establishment (FIG. 3), local manager selection (FIG. 4), sidelink and cellular resource configuration (FIG. 5), mobility and measurements (and reporting) (FIG. 6), group communication and vehicular platooning support (FIG. 7) and V2X configuration and local manager association (FIG. 8). Note that the framework 220 is extendable to include other aspects and concepts that support V2X multi-connectivity.

Figure 3:
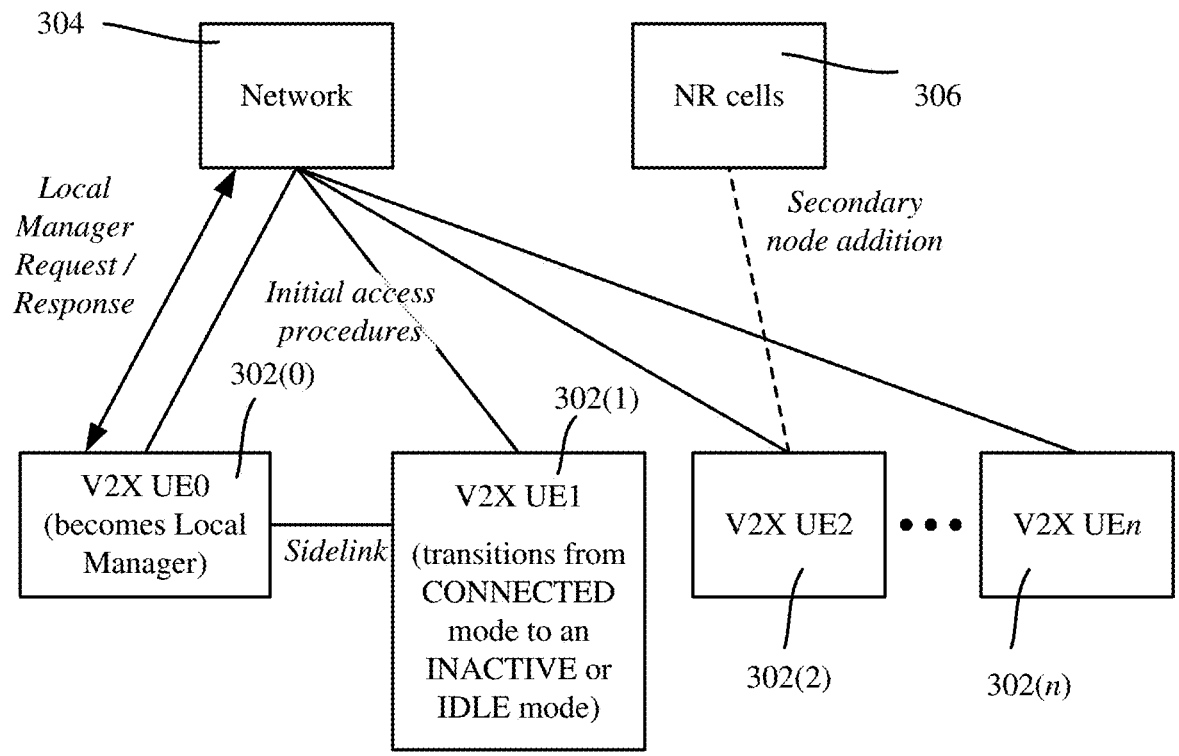
FIG. 3 illustrates various example aspects and components related to initial access and V2X establishment for multi-connectivity communications, in accordance with various aspects and implementations of the subject disclosure.

With respect to initial access and V2X establishment, in one or more implementations generally represented in FIG. 3, under multi-connectivity, V2X UEs 302(1)-302(n) are connected to the network (block 304) by performing one or more initial access procedures (e.g., synchronization signal detection and random access procedure) via the MCG (master cell group) (e.g. LTE or sub-6 GHz NR carrier, FR1). Thereafter, one or more of the UEs (e.g., 302(2)) are able to access one or more NR cells (e.g., block 306) via one or more procedures such as secondary node addition.

In one example implementation, the cellular links for control signaling are on a MCG, while cellular data service is provided on a SCG (secondary cell group). Sidelink also may be configured on an additional SCG from the cellular SCG, or may be configured as a different type of connectivity association, such as a V2X cell group (VCG) or sidelink connectivity leg (SCL). In one example implementation, the sidelink connectivity is established on the MCG or sub6-GHz anchor carrier, without needing additional control signaling over sidelink, except for the transmission of one or more sidelink discovery reference signals (SL-DRS).

V2X UEs also need a mechanism for performing initial access even if they are only engaged in direct communication services between V2X UEs over sidelink. In one example, when the sidelink communication takes place on licensed spectrum, the initial access on the cellular network provides security functionality such as user authentication and authorization before the direct communication can proceed.

Moreover, during the connection establishment, one or more V2X UEs (e.g., the V2X UE 302(0)) may indicate a request to establish V2X communication and request to act as local manager or mobile IAB relay. The network 304 may accept the request to configure and authorize V2X communication or may reject the request in a temporary or permanent fashion. In this example, the V2X UE 302(0) is authorized to act as a local manager, at least temporarily. The signaling from the network may further include one or more V2X ID(s) for the UEs such as a radio network temporary identifier (RNTI) or sidelink RNTI (SL-RNTI), which if provided can be additionally associated with direct, groupcast, and broadcast communication and/or additional security-related information (e.g. keys or key generators).

Further note that after the cellular network connectivity is established, the V2X UE may perform discovery and local manager association operations on the sidelink-associated carrier. Example local manager association operations are described with reference to FIG. 7.

In addition, while initial access and mobility are provided, e.g., by the sub-6 GHz anchor carrier, the connectivity state of the V2X UE (e.g., CONNECTED, INACTIVE, and IDLE) may or may not be independent for the cellular links and sidelink. For example, in one alternative implementation, if the V2X UE does not have any active cellular traffic transmissions a V2X UE (e.g., 302(2)) may transition from a CONNECTED mode to an INACTIVE or IDLE mode to save power and other resources; however direct communication over sidelink may be ongoing. In one alternative implementation, a V2X UE may continue with the V2X communications (e.g. remaining in a sidelink ACTIVE state); however, that UE may periodically monitor system information such as via broadcast, paging, and other INACTIVE/IDLE mode transmissions specific to V2X in case of any changes to the configuration. Additionally, a V2X UE may periodically inform the network of V2X related feedback (e.g., measurements, traffic volume, changes in local manager association or status) by either returning to the CONNECTED MODE or by a suitable (e.g., "special") V2X signaling channel.

In yet another alternative implementation, even while the V2X UE has no traffic (cellular or sidelink) of its own, a V2X UE (e.g., 302(0) can remain in the CONNECTED mode. This alternative may apply only to V2X UEs acting as local managers/mobile IAB relays, because local managers/mobile IAB relays need to provide resource allocation/traffic routing services for V2X UEs even if they do not have any ongoing communication associated with their own traffic.

Figure 4:
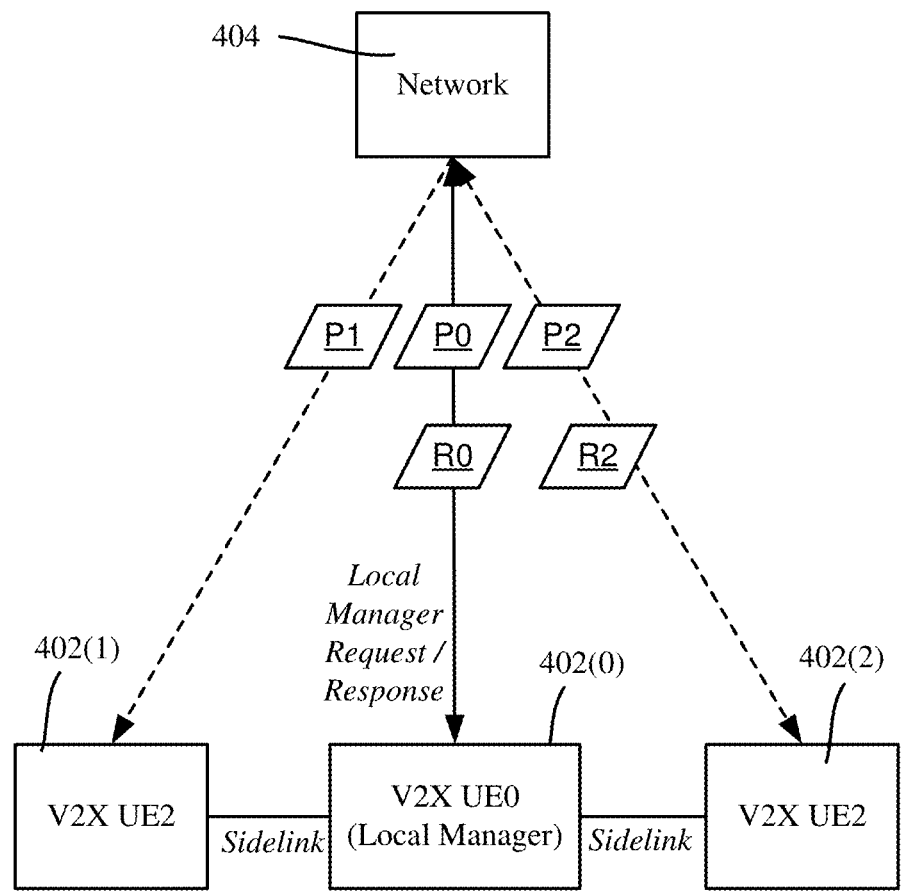
FIG. 4 illustrates various example aspects and components related to local manager selection for V2X multi-connectivity communications, in accordance with various aspects and implementations of the subject disclosure.

Turning to FIG. 4, with respect to local manager selection, as described herein, V2X UEs may be associated with a local manager (e.g., V2X UE 402(0)) that assists with discovery and provides resource allocation, scheduling, and link adaptation feedback to other V2X UES, e.g., 402(1) and V2X 402(2). The association of the V2X UEs, e.g., 402(1) and 402(2) with a local manager (e.g., V2X UE 402(0)) may be provided directly by the local manager through a distributed procedure, or can be centrally determined and configured by a network 404 (as represented via the dashed arrows). In one example implementation, the configuration of parameters P0-P2 related to local manager association may be provided by control signaling on a cellular link (e.g. LTE or NR sub6-GHz carrier). Example parameters may include, but are not limited to, measurement resources for local manager discovery, thresholds for local manager selection, synchronization and timing assistance parameters, IDs of candidate local managers (e.g. RNTI or SL-RNTI), timers associated with local manager association durations, and a list of associated V2X UEs for a given local manager or V2X UEs which can be reached for broadcast, groupcast, or unicast communication over sidelink, e.g., V2X UE 402(0) or V2X IDs (e.g. RNTI or SL-RNTI). This information may be provided by system-information signaling or by dedicated (e.g. RRC, described below) signaling to V2X UEs.

Additionally, the network 404 may request reports (e.g., R0 and R2) comprising radio measurements or other feedback periodically from one or more local managers or candidate local managers, such as sidelink capability data (e.g., hardware such as number of antennas/panels, supported data rates, maximum number of supportable UEs, battery/power consumption metrics and so on), and/or V2X service availability (e.g., support for sensor processing, local breakout, latency budget and so on). Based on the reports, the network 404 may assign one or more candidate V2X UEs to be local managers (e.g., one local manager per group of one or more UEs), as well as determine association of regular V2X UEs to a given local manager. For example, the network may determine local managers and UE association based on metrics that tend to maximize sidelink spectral efficiency or coverage, ensure QoS, or based on location/velocity characteristics.

In another example, V2X UEs (e.g., 402(1) and 402(2)) may request a specific local manager association or to change a current association. The network 404 may further utilize reports related to the sidelink performance via control signaling on the MCG from V2X UEs, including mobility, channel, and location measurements, buffer status reports, and throughput statistics.

Figure 5:
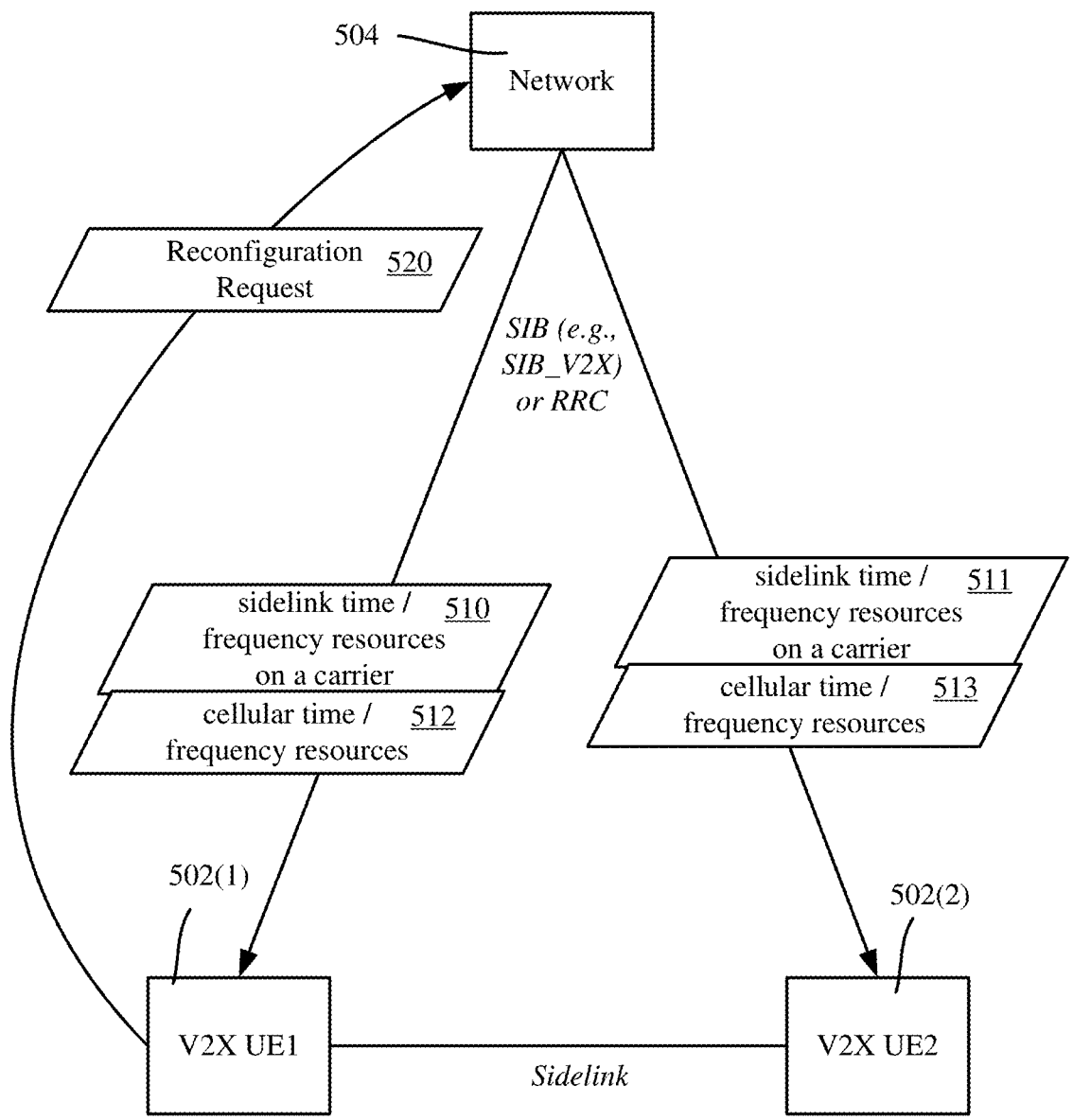
FIG. 5 illustrates various example aspects and components related to radio resource configuration for V2X multi-connectivity communications, in accordance with various aspects and implementations of the subject disclosure.

Turning to aspects related to radio resource configuration, in another example generally represented in FIG. 5, the time/frequency resources on a carrier may be partitioned between sidelink communications and cellular communications, as represented via blocks of parameters 510-513. If so, the V2X UE or UEs (e.g., 502(1) and 502(2)) are informed of the set of resources, e.g., for sidelink transmission/reception, based on control plane signaling provided by the network 504. A single broadcast message can provide the resource configuration information. Furthermore, the configuration of physical and higher layer parameters may be via a system information broadcast (e.g. SIB). In order to support efficient configuration of such parameters (on LTE or NR cellular carrier), a dedicated SIB message SIB V2X may be transmitted, which only V2X node UEs are configured to receive and utilize. In an alternative example, these parameters may be provided by higher layer signaling (e.g. RRC) in order to provide V2X UE-specific configuration.

The parameters 510-513 provided for V2X configuration may include a list of valid carriers/bandwidth parts for sidelink operation, slot patterns for TDM of sidelink resources, transmit power (control) parameters, and/or timing or synchronization reference signals.

In another example a UE (e.g., 502(1)) may request (block 520) a reconfiguration of the V2X parameters due to a change in service requirements, UE mobility, or other factors.

As shown and described above with reference to FIG. 1, different combinations of frequency carriers, cellular/sidelink interfaces, and/or services can be provided for a specific V2X UE at a given time. The primary control carrier (e.g. MCG) can be responsible for configuring a given combination at a specific instance (e.g. via RRC reconfiguration signaling). For example, a UE may wish to perform both cellular and direct communication on a given NR carrier. However, it may not be able to do so simultaneously, in which event the network may configure one service with a higher priority, or may indicate a time-division multiplexing switching pattern between the two services (e.g. cellular SCG and sidelink SCG).

Figure 6:
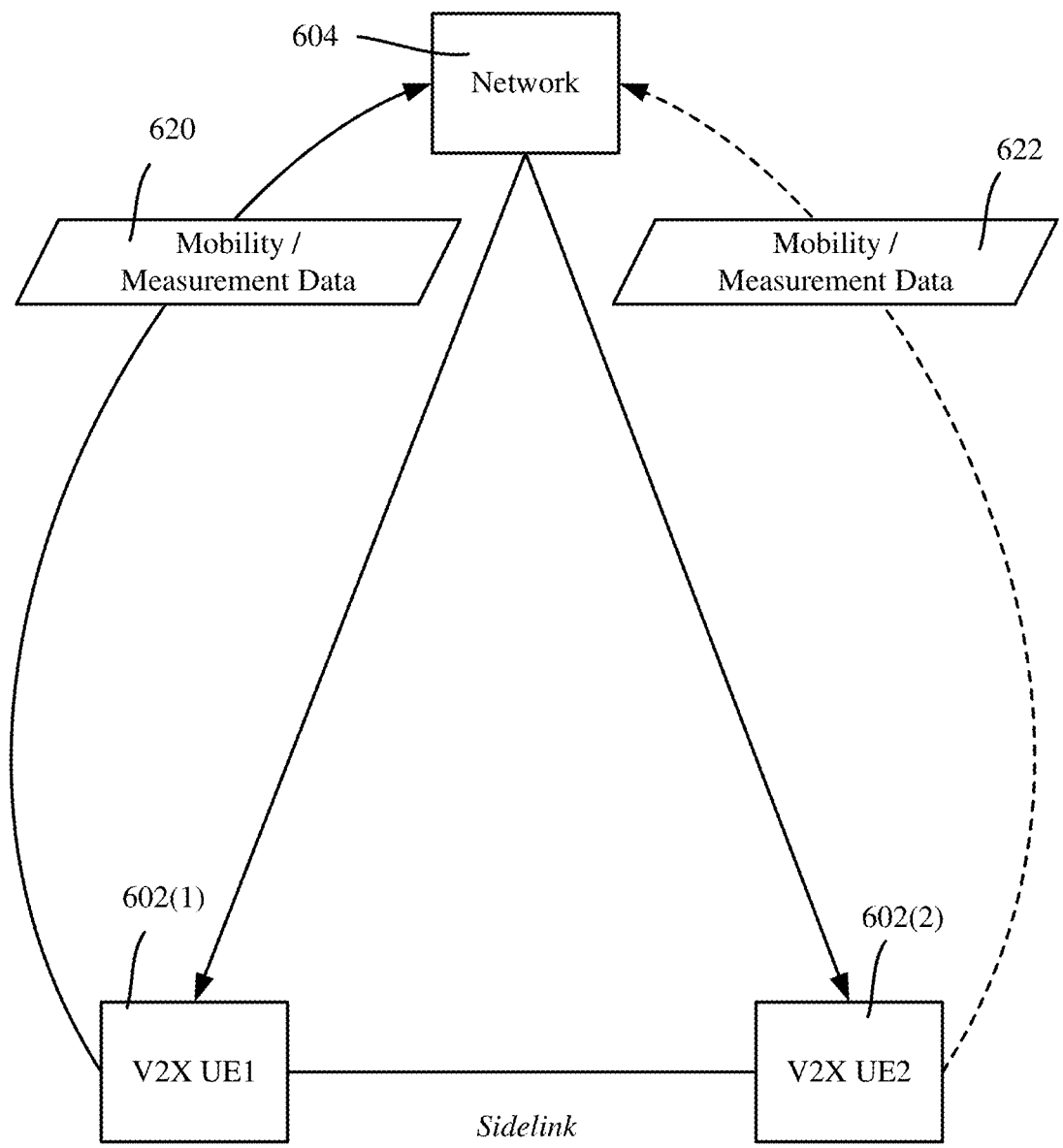
FIG. 6 illustrates various example aspects and components related to mobility and measurements for V2X multi-connectivity communications, in accordance with various aspects and implementations of the subject disclosure.

As generally represented in FIG. 6, aspects of the framework can be related to mobility and measurements. Such aspects of the framework allow the system to perform V2X discovery, association and communication. For example, mobility and measurement data, e.g., comprising measurements of sidelink quality along with other metrics (e.g. traffic load, latency, etc.) may be performed and exchanged across V2X UEs. However, with a multi-connectivity framework, the configuration, triggering, and exchange of CSI/RRM mobility and measurement data (blocks 620 and 622) can be provided by the V2X UEs 602(1) and 602(2) to a network 604 over the sub6-GHz anchor carrier instead of over the sidelink-associated carrier. This is beneficial in that doing so reduces the overhead of such signaling, as well as to enable global aggregation of measurements across multiple V2X UEs 602(1) and 602(2) at a centralized route management entity (e.g. co-located with LTE eNB/NR gNB-CU). These measurement exchanges may be part of the normal access UE measurement and reporting framework, or may involve specialized signaling only for V2X UEs with independent configuration of measurement and reporting parameters to support sidelink-specific measurement aggregation and events. In one example implementation, the sidelink measurements may be reported for individual V2X UEs or for a group of V2X UEs and associated with direct or broadcast communication, respectively; note that the dashed curved arrow in FIG. 6 represents the option of V2X UE 602(2)'s direct communication with the network 604, which can instead be performed by a group of V2X UEs, e.g., by having V2X UE 602(1) report mobility and measurement data as a local manager for the group.

Communication over the sub6-GHz anchor carrier links may also include the reporting of beam failure events, to assist in fast reconfiguration of beam management or local manager association parameters which may not be applicable for regular access UEs. This sub6-GHz anchor carrier reporting allows reestablishing a link or establishing a new link corresponding to a beam that failed.

In addition, the measurement framework can support V2X services even when the cellular network 604 is undergoing mobility events, by keeping the V2X communications active while the sub6-GHz carrier is performing the mobility-related procedure such as handover or SCG change. For example, a handover on sub6-GHz LTE or NR carrier may not result in a change in the local manager. UEs can continue to communicate over sidelink even while one (or both) of the UEs are undergoing a handover procedure. Additionally, even if radio link failure events occur on one or more of the cellular carriers, the V2X communications may remain ongoing under the existing configuration until the network connection is re-established.

In another example, in case of sidelink-related communication issues (e.g., blockage or link failures) the V2X UE(s) may inform the network via the MCG or control-plane anchor carrier about the situation and request a reconfiguration of the V2X-related parameters and configurations.

In another aspect of the framework related to group communication and vehicular platooning support, as generally represented in FIG. 7, the V2X multi-connectivity framework described herein can be used to improve (and possibly optimize) the performance of different vehicle communication services. For example, communication between a group 770 of vehicles (V2X OEs 702(1)-702(2)) can be facilitated by the network to improve the resource allocation and user association via the control signaling anchor carrier, while the data plane traffic is carried over sidelink.

One desirable example of group communication is vehicular platooning, in which a set of vehicles are linked together and typically coordinate via vehicle-to-vehicle communication. In one example implementation, the multi-connectivity framework described herein can facilitate the exchange of trajectory/speed/sensor data (e.g., GPS s/vehicle status information/video/RADAR/LIDAR etc.) from the platoon to the network via the control signaling anchor carrier, which can be further connected with a vehicle platoon management entity at the network access point or centralized in the core network. This allows possibly complex coordination and the like to be performed by the network, with the results returned to the vehicle platoon management entity, rather than perform the coordination computations and the like in the platoon.

Turning to V2X configuration and local manager association operations, FIG. 8 exemplifies an overall procedure for establishing V2X connectivity utilizing control plane signaling and configuration from the cellular network. In a first phase, the V2X UEs 802(0)-802(2) perform (e.g., normal) cellular initial access and connection establishment with the network device 804 (e.g., gNB) on an LTE or NR cellular carrier.

In another phase, after the cellular link is established, the V2X UEs 802(0)-802(2) indicate a request for a V2X configuration, and can optionally request to be authorized to act as local managers. In the example of FIG. 8, the V2X UEs 802(0) and 802(1) request V2X configuration and local manager establishment, while the V2X UEs 802(2) only requests V2X configuration. The network determines whether the V2X UEs are authorized for direct communication and for those requesting local manager establishment, whether each can act as a local managers.

In the example of FIG. 8, the V2X UEs 802(0)-802(2) each receive corresponding configuration data, while the V2X UE 802(0) also receives local manager establishment, and the V2X UE 802(1) also receives local manager rejection. In this way, the V2X UE 802(0) becomes a local manager.

In another phase, the local manager(s), in this example only the V2X UE 802(0), begins broadcasting sidelink discovery signals (SL-DRS) according to the appropriate configuration provided by the network. The sidelink discovery signals are detected and measured by the other V2X UEs 802(1) and 802(2), which in response, return SL-DRS reports to the network device 804. The SL-DRS reports are provided to the network device 804in order to determine appropriate association of the V2X UEs with local managers. As further represented in FIG. 8, this association is informed to the UEs via control signaling on the cellular link (e.g. sub6-GHz anchor carrier).

After the association is established, which in this example associate the V2X UEs 802(1) and 802(2) with the local manager V2X UE 802(0), the V2X UEs may engage in direct communication based on the resource allocation/scheduling provided by their respective local manager 802(0).

Figure 9:
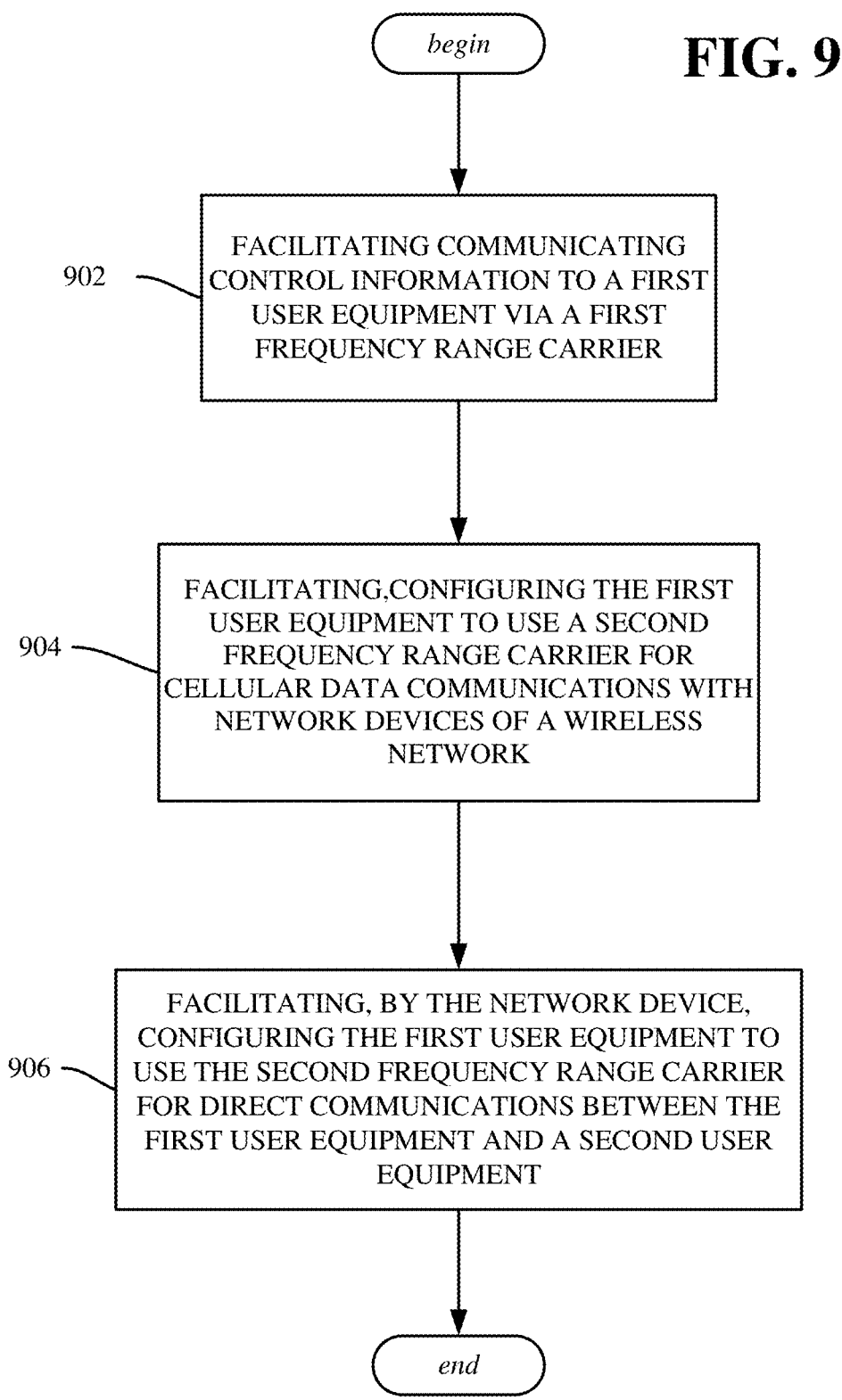
FIG. 9 illustrates an example flow diagram of network device operations, in accordance with various aspects and implementations of the subject disclosure.

FIG. 9 represents general, example operations of a network device of a wireless network. Operation 902 represents facilitating, by the network device, communicating control information to a first UE via a first frequency range carrier. Operation 904 represents facilitating, by the network device, configuring the first UE to use a second frequency range carrier for cellular data communications with network devices of the wireless network. Operation 906 represents facilitating, by the network device, configuring the first UE to use the second frequency range carrier for direct communications (e.g., via sidelink, rather than through the network) between the first UE and a second UE.

The control information can be first control information, and further aspects can comprise facilitating, by the network device, communicating second control information via the first frequency range carrier that facilitates reconfiguring the first UE to use the first frequency range carrier for the direct communications between the first UE and the second UE.

The control information can be first control information, and further aspects can comprise facilitating, by the network device, communicating second control information via the first frequency range carrier that facilitates reconfiguring the first UE to use the first frequency range carrier for the cellular data communications with the wireless network.

The direct communications can be first direct communications, and further aspects can comprise facilitating, by the network device, communicating, via the first frequency range carrier, with the second UE to authorize a third UE for second direct communications between the third UE and the first UE.

The control information can be first control information, and further aspects can comprise facilitating, by the network device, second control information via the first frequency range carrier, wherein the second control information facilitates selecting the first UE as a local manager with respect to management of the direct communications between the first UE and the second UE.

The control information can be first control information, and further aspects can comprise facilitating, by the network device, communicating second control information via the first frequency range carrier, wherein the second control information facilitates partitioning resources of the first UE between the cellular data communications with the wireless network, and the direct communications between the first UE and the second UE.

Further aspects can comprise facilitating, by the network device, receiving, via the first frequency range carrier, measurement information from the first UE. The direct communications can be first direct communications, the control information can be first control information, and further aspects can comprise facilitating, by the network device, receiving, via the first frequency range carrier, group information corresponding to a group of members comprising the first UE and the second UE, and facilitating, by the network device, communicating second control information via the first frequency range carrier that facilitates allocating resources of the group to coordinate second direct communications between the members of the group.

Figure 10:
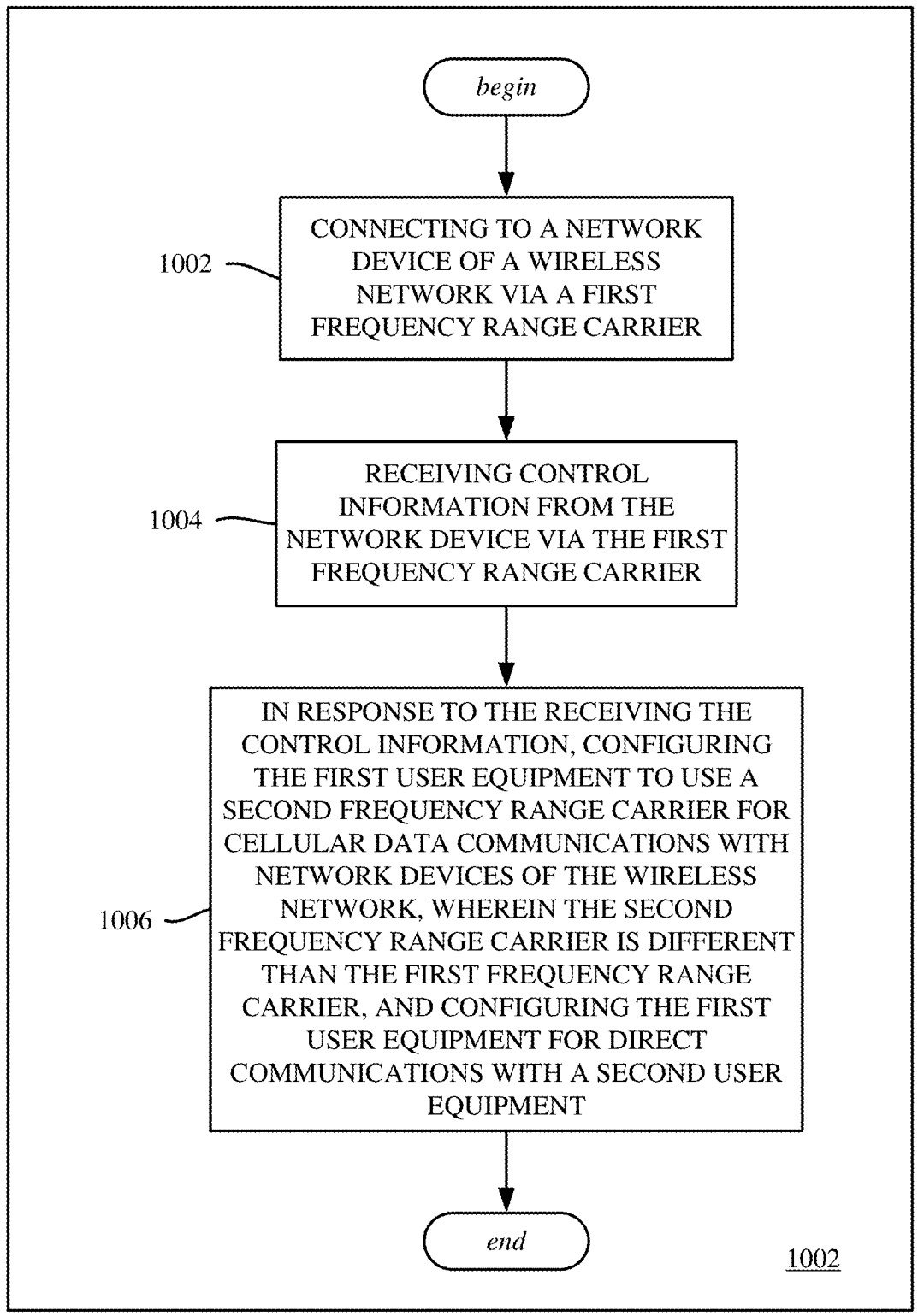
FIG. 10 illustrates an example block diagram illustrating example operations of a V2X multi-connectivity user equipment, in accordance with various aspects and implementations of the subject disclosure.

FIG. 10 illustrates an example block diagram illustrating example operations of a V2X multi-connectivity UE 1002, e.g., comprising a processor and a memory that stores executable instructions that, when executed by the processor, facilitate performance of the operations. Operation 1002 represents connecting to a network device of a wireless network via a first frequency range carrier. Operation 1004 represents receiving control information from the network device via the first frequency range carrier. Operation 1006 represents, in response to the receiving the control information, configuring the first UE to use a second frequency range carrier for cellular data communications with network devices of the wireless network, wherein the second frequency range carrier is different than the first frequency range carrier, and configuring the first UE for direct communications with a second UE.

Further operations can comprise operating the first UE in a connected mode with respect to the cellular data communications, and transitioning from the connected mode to a mode in which the UE is not active with respect to the cellular data communications and is active with respect to the direct communications between the first UE and the second UE.

Further operations can comprise, operating the first UE as a local manager with respect to managing the direct communications between the first UE and the second UE, and communicating local manager information, generated by the local manager, to the network device via the first frequency range carrier. Communicating the local manager information with the network device via the first frequency range carrier can comprise communicating local manager capability data to the network device representative of at least one capability of the local manager. Operating the first UE as the local manager with respect to the managing of the direct communications between the first UE and the second UE can comprise relaying data of the second UE via the second frequency range carrier.

The first UE and the second UE can be comprised in a group of members, and further operations can comprise, transmitting, by the UE to the network device via the first frequency range carrier, group information to coordinate direct communication between the members of the group.

Figure 11:
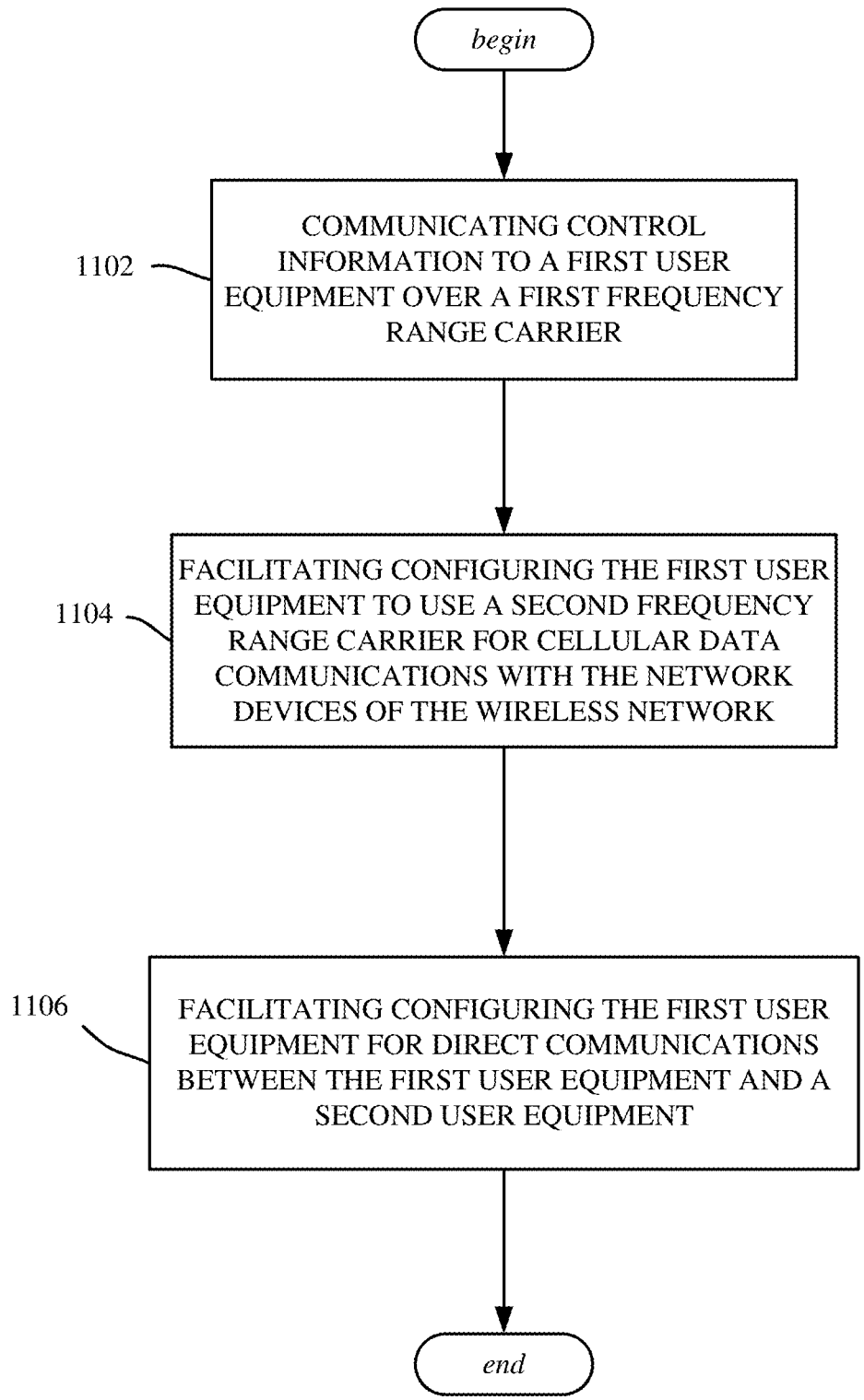
FIG. 11 illustrates an example flow diagram of network device operations, e.g., embodied as instructions executable by a processor, in accordance with various aspects and implementations of the subject disclosure.

FIG. 11 illustrates an example flow diagram of network device operations, e.g., embodied as instructions executable by a processor, in accordance with various aspects and implementations of the subject disclosure. Operation 1002 represents communicating control information to a first UE over a first frequency range carrier. Operation 1004 represents facilitating configuring the first UE to use a second frequency range carrier for cellular data communications with the network devices of the wireless network. Operation 1006 represents facilitating configuring the first UE for direct communications between the first UE and a second UE Facilitating the configuring of the first UE for the direct communications between the first UE and the second UE can comprise configuring the first UE to use the first frequency range carrier for the direct communications between the first UE and the second UE.

Facilitating the configuring of the first UE for the direct communications between the first UE and the second UE can comprise configuring the first UE to use the second frequency range carrier for the direct communications between the first UE and the second UE.

Further operations can comprise, receiving local manager capability data over the first frequency range carrier from the first UE, and based on the local manager capability data, selecting the first UE as a local manager with respect to managing the direct communications between the first UE and the second UE.

Further operations can comprise, communicating further control information over the first frequency range carrier that facilitates partitioning resources of the first UE between the cellular data communications with the wireless network, and the direct communications between the first UE and the second UE.

Further operations can comprise, receiving, over the first frequency range carrier, group information corresponding to a group of members comprising the first UE and the second UE, and communicating further control information over the first frequency range carrier that facilitates allocating resources of the group to coordinate direct communication between the members of the group.

As can be seen, the technology described herein provides for increased robustness and reduced latency of initial access and V2X configuration when control plane and mobility signaling is provided over a sub6-GHz anchor link via multi-connectivity, (compared to a standalone architecture), in which V2X-capable UEs provide initial access, IDLE mode, control plane, and mobility functionality. The technology facilitates reduced overhead on mmWave backhaul links multiplexing cellular and V2X traffic (of one or more bands) by utilizing sub 6-GHz channels for control plane signaling instead of multiplexing both control and data links on mmWave bands. Still further, the technology described herein provides the ability to efficiently perform local manager configuration and association based on measurements/ reports related to sidelink link quality metrics over sub6-GHz channels more efficiently than over the NR mmWave backhaul links. The technology described herein enables support for simultaneous cellular communication with a network infrastructure, in addition to V2X direct communication services on the same or different carriers.

Figure 12:
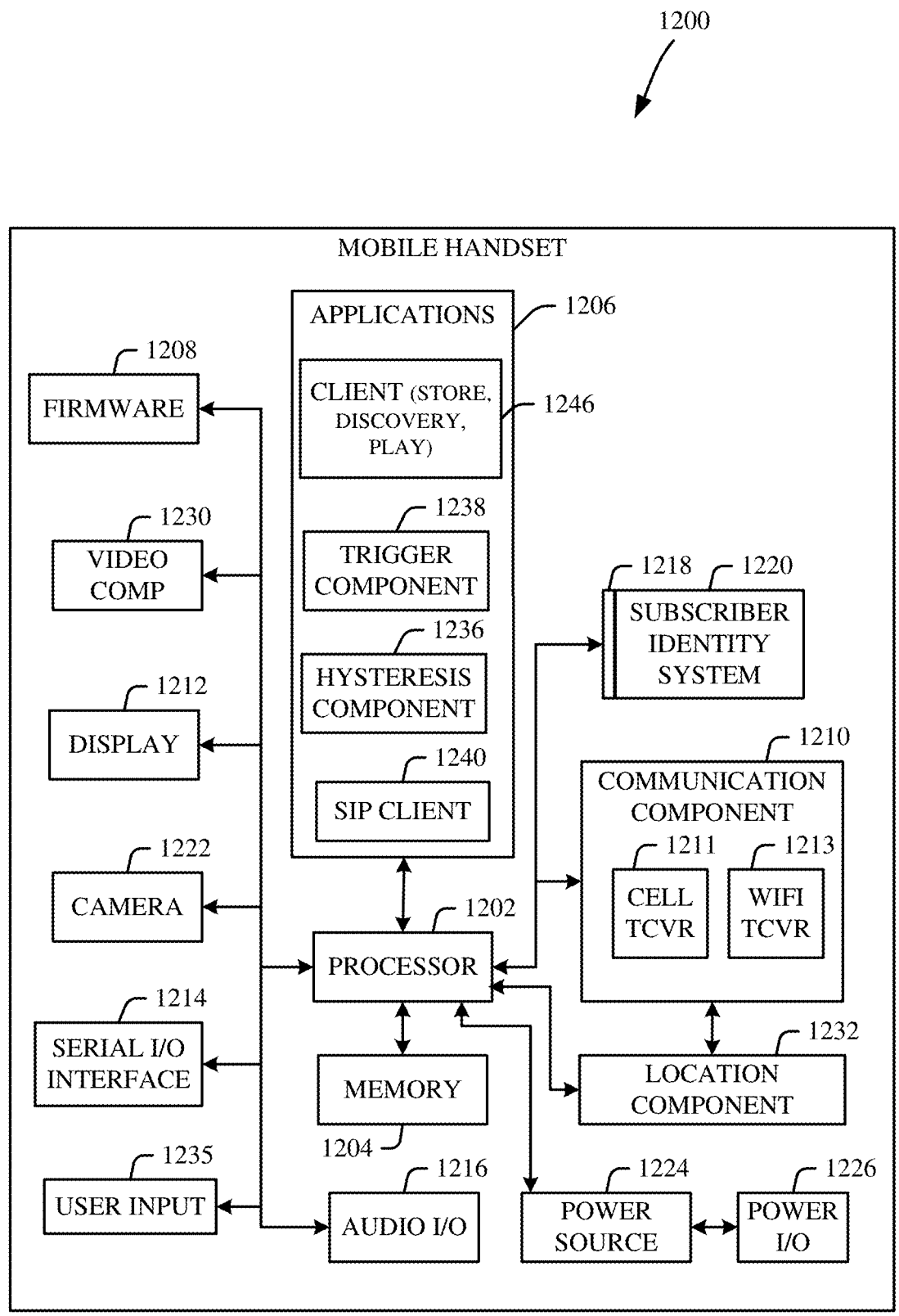
FIG. 12 illustrates an example block diagram of an example mobile handset operable to engage in a system architecture that facilitates wireless communications according to one or more embodiments described herein.

Referring now to FIG. 12, illustrated is an example block diagram of an example mobile handset 1200 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or a decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
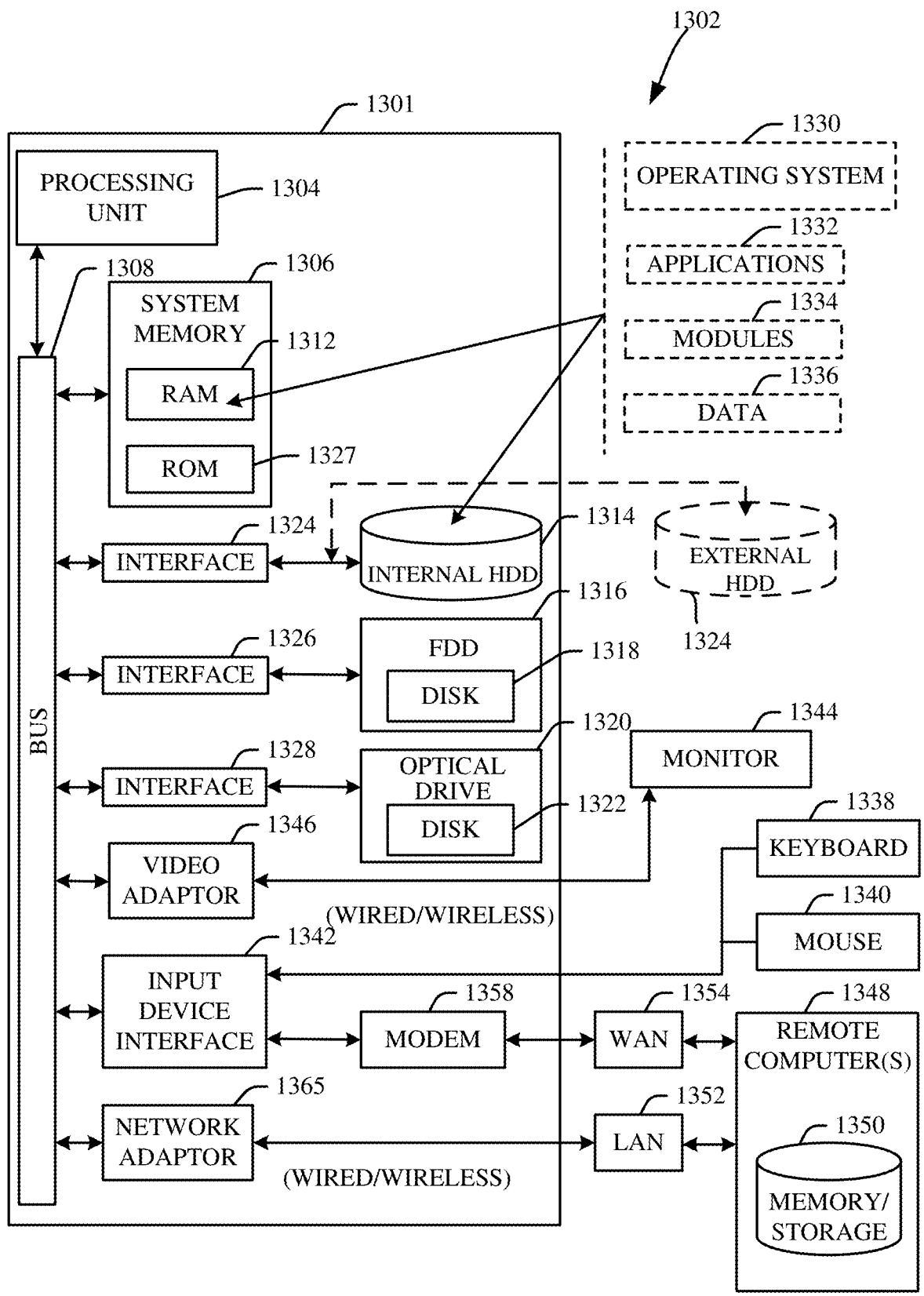
FIG. 13 illustrates an example block diagram of an example computer operable to engage in a system architecture that facilitates wireless communications according to one or more embodiments described herein.

Referring now to FIG. 13, illustrated is an example block diagram of an example computer 1300 operable to engage in a system architecture that facilitates wireless communications according to one or more embodiments described herein. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 13 is but one example of a computing device.

In order to provide a context for the various aspects of the disclosed subject matter, FIG. 13 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 13 illustrates a block diagram of a computing system 1300 operable to execute the disclosed systems and methods in accordance with an embodiment. Computer 1312, which can be, for example, part of the hardware of system 1320, includes a processing unit 1314, a system memory 1316, and a system bus 1318. System bus 1318 couples system components including, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1316 can include volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 can also include removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 13 describes software that acts as an intermediary between users and computer resources described in suitable operating environment 1300. Such software includes an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be noted that the disclosed subject matter can be implemented with various operating systems or combinations of operating systems.

A user can enter commands or information into computer 1312 through input device(s) 1336. As an example, a mobile device and/or portable device can include a user interface embodied in a touch sensitive display panel allowing a user to interact with computer 1312. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1314 through system bus 1318 by way of interface port(s) 1338. Interface port(s) 1338 include, for example, a serial port, a parallel port, a game port, a universal serial bus (USB), an infrared port, a Bluetooth port, an IP port, or a logical port associated with a wireless service, etc. Output device(s) 1340 and a move use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340 like monitors, speakers, and printers, among other output devices 1340, which use special adapters. Output adapters 1342 include, by way of illustration and not limitation, video and sound cards that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, cloud storage, cloud service, a workstation, a microprocessor based appliance, a peer device, or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected by way of communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
   a processor; and
   a memory that stores executable instructions that, when executed by the processor, facilitate performance of operations, the operations comprising:
      communicating control information to a first user equipment using a first frequency range carrier via a first communication connection with the first user equipment, wherein the control information facilitates configuration of the first user equipment to:
         use a second frequency range carrier via a second communication connection for cellular data communications,
         use the second frequency range carrier via a third communication connection for direct communications between the first user equipment and a second user equipment, and
         maintain the first communication connection, the second communication connection, and the third communication connection concurrently,
      wherein a first frequency range of the first frequency range carrier comprises a sub-6 GHz frequency range and a second frequency range of the second frequency range carrier comprises a millimeter wave frequency range.

2. The network equipment of claim 1, wherein the control information is first control information, and the operations further comprise:
   communicating second control information using the first frequency range carrier, wherein the second control information facilitates reconfiguration of the first user equipment to use the first frequency range carrier for the direct communications between the first user equipment and the second user equipment.

3. The network equipment of claim 1, wherein the control information is first control information, and the operations further comprise:
   communicating second control information using the first frequency range carrier, wherein the second control information facilitates reconfiguration of the first user equipment to use the first frequency range carrier for the cellular data communications with the network equipment.

4. The network equipment of claim 1, wherein the direct communications are first direct communications, and the operations further comprise:
   communicating, using the first frequency range carrier, with the second user equipment to authorize a third user equipment for second direct communications between the third user equipment and the first user equipment.

5. The network equipment of claim 1, wherein the control information is first control information, and the operations further comprise:
   communicating second control information using the first frequency range carrier, wherein the second control information facilitates reconfiguration of the first user equipment as a local manager with respect to management of the direct communications between the first user equipment and the second user equipment.

6. The network equipment of claim 1, wherein the control information is first control information, and the operations further comprise:
communicating second control information using the first frequency range carrier, wherein the second control information facilitates partitioning of resources of the first user equipment between the cellular data communications and the direct communications.

7. The network equipment of claim 1, wherein the control information is first control information, and the operations further comprise:
configuring, using the second frequency range carrier, the first user equipment with a time-division multiplexing switching pattern to use for the cellular data communications and the direct communications.

8. A method, comprising:
receiving, by a first user equipment comprising a processor, from network equipment, control information employing a first frequency range carrier over a first communication connection; and
in response to receiving the control information:
employing, by the first user equipment, a second frequency range carrier over a second communication connection for cellular data communications, wherein a second frequency range of the second frequency range carrier comprises a millimeter wave frequency range and a first frequency range of the first frequency range carrier comprises a sub-6 GHz frequency range,
employing, by the first user equipment, the second frequency range carrier over a third communication connection for direct communications with a second user equipment, and
maintaining, by the first user equipment, the first communication connection, the second communication connection, and the third communication connection concurrently.

9. The method of claim 8, further comprising:
operating, by the first user equipment, in a connected mode with respect to the cellular data communications, and
transitioning, by the first user equipment, from the connected mode to a mode in which the first user equipment is not active with respect to the cellular data communications and is active with respect to the direct communications.

10. The method of claim 8, further comprising:
operating, by the first user equipment, as a local manager with respect to managing the direct communications between the first user equipment and the second user equipment, and
communicating, by the first user equipment, local manager information to the network equipment employing the first frequency range carrier.

11. The method of claim 10, wherein communicating the local manager information with the network equipment employing the first frequency range carrier comprises communicating local manager capability data, to the network equipment, representative of at least one capability of the local manager.

12. The method of claim 10, wherein operating as the local manager with respect to the managing of the direct communications between the first user equipment and the second user equipment comprises relaying data of the second user equipment employing the second frequency range carrier.

13. The method of claim 8, wherein the first user equipment and the second user equipment are comprised in a group of members, and further comprising transmitting, by the first user equipment to the network equipment employing the first frequency range carrier, group information to coordinate direct communication between the members of the group.

14. The method of claim 8, employing, by the first user equipment, a time-division multiplexing switching pattern for the cellular data communications and the direct communications.

15. A non-transitory machine-readable medium, comprising executable instructions that, when executed by a processor of a first user equipment, facilitate performance of operations, the operations comprising:
receiving control information from network equipment using a first frequency range carrier via a first communication connection; and
in response to receiving the control information:
employing a second frequency range carrier via a second communication connection for cellular data communications, wherein a second frequency range of the second frequency range carrier comprises a millimeter wave frequency range and a first frequency range of the first frequency range carrier comprises a sub-6 GHz frequency range,
employing the second frequency range carrier via a third communication connection for direct communications with a second user equipment, and
maintaining the first communication connection, the second communication connection, and the third communication connection concurrently.

16. The non-transitory machine-readable medium of claim 15, wherein the operations further comprise:
functioning in a connected mode with respect to the cellular data communications, and
switching from the connected mode to a mode in which the first user equipment is not active with respect to the cellular data communications and is active with respect to the direct communications.

17. The non-transitory machine-readable medium of claim 15, wherein the operations further comprise:
functioning as a local manager with respect to managing the direct communications between the first user equipment and the second user equipment, and
sending local manager information to the network equipment using the first frequency range carrier.

18. The non-transitory machine-readable medium of claim 17, wherein the local manager information comprises local manager capability data representative of a capability of the local manager.

19. The non-transitory machine-readable medium of claim 17, wherein functioning as the local manager with respect to the managing of the direct communications between the first user equipment and the second user equipment comprises relaying data of the second user equipment using the second frequency range carrier.

20. The non-transitory machine-readable medium of claim 15, wherein the direct communications are first direct communications, wherein the first user equipment and the second user equipment are comprised in a group of user equipment, and wherein the operations further comprise sending, to the network equipment using the first frequency range carrier, group information to coordinate second direct communications between the user equipment of the group.

* * * * *